United States Patent
Moniot et al.

(10) Patent No.: US 7,424,022 B2
(45) Date of Patent: Sep. 9, 2008

(54) METHOD AND CIRCUIT FOR PROVIDING A CONTEXT DATUM OF A DEVICE BASED ON AN ADDRESS ASSOCIATED WITH THIS DEVICE

(75) Inventors: Pascal Moniot, Bernin (FR); David Furodet, Saint Martin D'Heres (FR)

(73) Assignee: STMicroelectronics S.A., Montrouge (FR)

( * ) Notice: Subject to any disclaimer, the term of this patent is extended or adjusted under 35 U.S.C. 154(b) by 960 days.

(21) Appl. No.: 10/394,506

(22) Filed: Mar. 21, 2003

(65) Prior Publication Data

US 2003/0225882 A1 Dec. 4, 2003

(30) Foreign Application Priority Data

Mar. 22, 2002 (FR) .................................. 02 03628

(51) Int. Cl.
*H04L 12/28* (2006.01)
*G06F 12/00* (2006.01)
(52) U.S. Cl. .................... 370/392; 711/202; 711/216
(58) Field of Classification Search ................ 370/389, 370/392; 711/216, 202
See application file for complete search history.

(56) References Cited

U.S. PATENT DOCUMENTS

| 5,436,893 | A | * | 7/1995 | Barnett ...................... 370/392 |
| 5,732,081 | A | | 3/1998 | Grenot et al. |
| 6,262,985 | B1 | | 7/2001 | Huang et al. |
| 6,279,097 | B1 | | 8/2001 | Kaku |
| 6,633,865 | B1 | * | 10/2003 | Liao .............................. 707/3 |
| 6,842,791 | B2 | * | 1/2005 | Navada et al. ................. 710/1 |
| 7,275,077 | B2 | * | 9/2007 | Moniot et al. ............... 709/200 |
| 7,315,554 | B2 | * | 1/2008 | Baum et al. ................. 370/419 |

* cited by examiner

*Primary Examiner*—Firmin Backer
*Assistant Examiner*—Nittaya Juntima
(74) *Attorney, Agent, or Firm*—Lisa K. Jorgenson; James H. Morris; Wolf, Greenfield & Sacks, P.C.

(57) ABSTRACT

A method for providing a context datum associated with a source and/or destination device based on an address datum associated with the device, including addressing, based on the address datum, a unit for providing an index, the unit containing, for each address datum, an indicator indicating whether the device is active; and addressing, based on the index provided by the unit, a context memory for providing the context datum associated with the device.

10 Claims, 3 Drawing Sheets

METHOD AND CIRCUIT FOR PROVIDING A CONTEXT DATUM OF A DEVICE BASED ON AN ADDRESS ASSOCIATED WITH THIS DEVICE

BACKGROUND OF THE INVENTION

1. Field of the Invention

The present invention relates to a method for providing a context datum associated with a source and/or destination device based on an address datum associated with said device.

2. Discussion of the Related Art

In a network communication system, for example, a system using the Ethernet protocol, several electronic devices such as computers can exchange data via switching equipment such as an Ethernet router.

FIG. 1 schematically shows a communication system in which several devices A, B, C, and D are connected by a local area network (LAN). Device A, typically a personal computer or a workstation, comprises an Ethernet interface 2A connected to an Ethernet interface 6A of a switching equipment 8 via a connection 4A. Device B comprises an Ethernet interface 2B also connected to Ethernet interface 6A of switching equipment 8. Device C comprises an Ethernet interface 2C connected to an Ethernet interface 6C of equipment 8 via a connection 4C. Similarly, an Ethernet interface 2D of device D is connected to an Ethernet interface 6D of equipment 8 via a connection 4D. Switching equipment 8 can be connected to a global network by an access not shown. Devices A, B, C, and D may, provided to use the VLAN protocol, form virtual fields distinct from one another.

According to the Ethernet protocol, each device can be identified by an Ethernet address, called a MAC address.

FIG. 2 schematically shows the format of a MAC address. A MAC address comprises 48 bits. The first two bits, IG and UL, respectively indicate whether the address is an individual address or a group address and whether the address administration is local or global. The next 22 bits identify the manufacturer of the device to which the address is assigned, and the last 24 bits correspond to a serial number associated with the device.

The devices connected to the switching equipment communicate by exchanging data by means of data packets.

FIG. 3 shows the format of a data packet (referenced at the medium level) in accordance with the Ethernet protocol. The packet structure includes the following fields:

SYNC, comprising synchronization words;

PREAMBLE (8 bits), the preamble indicating the beginning of the data packet;

AD-D (48 bits), the destination address which is the MAC address of the device for which the data are intended;

AD-S (48 bits), source address AD-S which is the MAC address of the device sending the packet; and when the packet is of VLAN type:

VLAN-TAG (16 bits), an optional field indicating that the corresponding packet conforms to the VLAN standard;

PR (3 bits) indicating, when the packet is of VLAN type, the priority level of the data packet and a field;

CFI (1 bit) (Canonical Field Information) specifying, when the packet is of VLAN type, whether the packet stands the source routing mode; and VID (12 bits) when the packet is of VLAN type, indicating the number of the virtual field associated with the packet.

Only those elements constitutive of the packet which are necessary to the understanding of the present invention are referenced in this document.

It is considered, as an example, that device A sends a data packet to device C. When switching equipment 8 receives the data packet, equipment 8 searches the contexts associated with:

information couple AD-D (in this case, the address of equipment C) and VID (that of the packet).

information couple AD-S (in this case, the address of equipment A) and VID (that of the packet).

Note: if the packet received by equipment 8 has an invalid VID or if the packet is not of VLAN type, equipment 8 assigns a predetermined value to identifier VID.

The context data associated with the MAC addresses of the source and destination devices and with address VID each comprise information enabling processing of the data packet. For example, this information may indicate that device A is not allowed to provide data to device C over virtual address network VID. If allowed by the context data associated with the source and destination devices and with address VID of the data packet, the data packet is transmitted to device C by switching equipment 8.

In practice, a communication system is provided to operate with a maximum number of devices. Equipment 8 can store each possible MAC/VID address couple of the system in a content-addressable memory (of CAM type). This CAM memory also stores, for each MAC/VID couple, a connection identifier (or index) which will be used to extract the associated connection context stored in the context memory. Any received MAC/VID couple is then compared with each couple stored in the CAM memory. When a received MAC/VID couple is identical to a specific stored couple, the context datum is retrieved from the context memory by means of the index stored with the specific couple. As an example, for a maximum number of 512 devices that can be operated in the system, equipment 8 must store 512 couples of 60 bits (48 MAC address bits, 12 VID address bits), to which are added 9 index bits to address the 512 locations in the context memory, that is, a total 35,328 bits. Further, a content-addressable memory conventionally includes a line comparator. In the described example, 512 comparators are necessary and take up a significant surface area, which is not desirable.

To avoid using such a content-addressable memory, it could be devised to directly point to the context memory by means of the received MAC/VID address couples. Such a solution however implies the use of a context memory with $2^{60}$ inputs, one for each possible MAC/VID couple, which is not a practical implementation in practice.

SUMMARY OF THE INVENTION

An object of the present invention is to provide a method for providing a context datum associated with a device based on an address datum associated with the device.

Another object of the present invention is to provide such a method enabling not using a large context memory.

Another object of the present invention is to provide a device for providing a context datum associated with a device based on an address datum associated with the device.

Another object of the present invention is to provide such a device enabling not using a large context memory.

To achieve these and other objects, the present invention provides a method for providing a context datum associated with a source and/or destination device based on an address datum associated with said device, comprising the steps of:

a) addressing, based on the address datum, a unit for providing an index, said unit containing, for each address datum, an indicator indicating whether the device is active; and b) addressing, based on the index provided by said unit, a context memory for providing the context datum associated with said device.

According to an embodiment of the present invention, the context memory is provided to contain a number m of context data equal to the maximum number of system devices that can be active, and the unit is provided to receive a greater number n of address data.

According to an embodiment of the present invention, the index provided by the unit is determined based on the number of indicators indicating an active device between a predetermined position of the unit and the indicator corresponding to said device.

According to an embodiment of the present invention, the unit comprises a table comprised of n bits distributed in an integral number of words of same size, each bit corresponding to an indicator having value 1 if said indicator indicates an active device and value 0 if not, a specific value being associated with each word; and the index associated with any indicator is determined based on the sum of the number of bits equal to 1 between the bit corresponding to said indicator and the beginning of the word containing said bit and of the predetermined value associated with said word.

According to an embodiment of the present invention, said context datum associated with said source and/or destination device and said address datum associated with said device are in accordance with the Ethernet communication protocol.

The present invention also aims at a circuit for, in a communication system, providing a context datum associated with a source and/or destination device based on an address datum associated with said device, comprising:

a unit addressable based on the address datum to provide an index, said unit containing, for each address datum, an indicator indicating whether the device is active; and a context memory provided for, based on the index provided by said unit, providing the context datum associated with said device.

According to an embodiment of the present invention, the context memory is provided to contain a number m of context data equal to the maximum number of system devices that can be active, and the unit is provided to receive a greater number n of address data.

According to an embodiment of the present invention, the unit comprises:

a storage means for storing n bits distributed in an integral number of words of same size, each bit corresponding to an indicator of the unit, and having value 1 if said indicator indicates an active device and value 0 if not, and a predetermined value associated with each word; and a calculation means for calculating the index associated with any indicator of the unit based on the sum of the number of bits equal to 1 between the bit corresponding to said indicator and the beginning of the word containing said bit, and of the predetermined value associated with said word.

According to an embodiment of the present invention, the calculation means comprises:

a masking means for providing only the bits located between a first bit corresponding to said indicator and a second bit corresponding to the least significant bit of the word containing the first bit, including the first and second bits;

a counting means for counting the bits having value 1 among the bits provided by the masking means; and an adder for adding the predetermined value associated with said word and the value provided by the counting means.

According to an embodiment of the present invention, the counting means comprises a ROM addressed by the bits provided by the masking means and storing, for each address provided by the masking means, the number of bits having value 1 used to code said address provided by the masking means.

The foregoing objects, features and advantages of the present invention will be discussed in detail in the following non-limiting description of specific embodiments in connection with the accompanying drawings.

DETAILED DESCRIPTION

Figure 1:
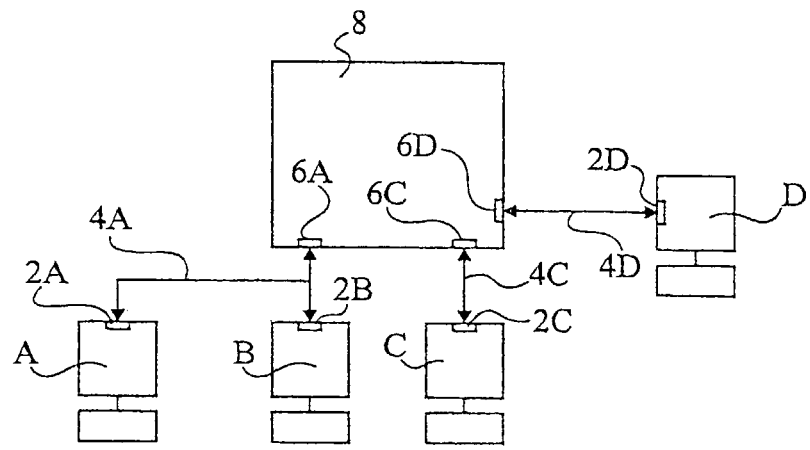
FIG. 1, previously described, schematically shows a conventional network communication system.
Figure 2:
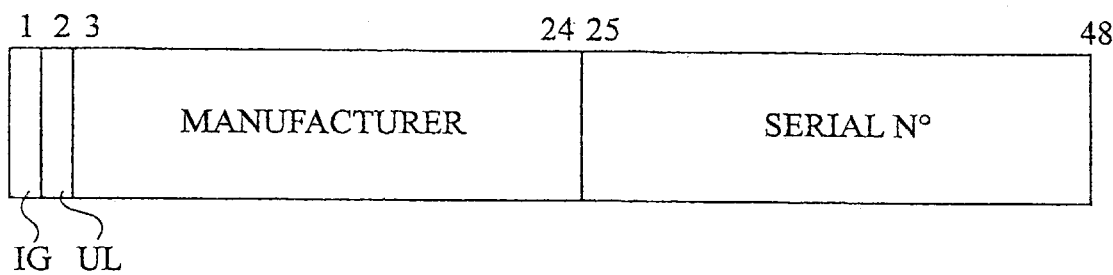
FIG. 2, previously described, illustrates the structure of a MAC address according to the Ethernet communication protocol.
Figure 3:
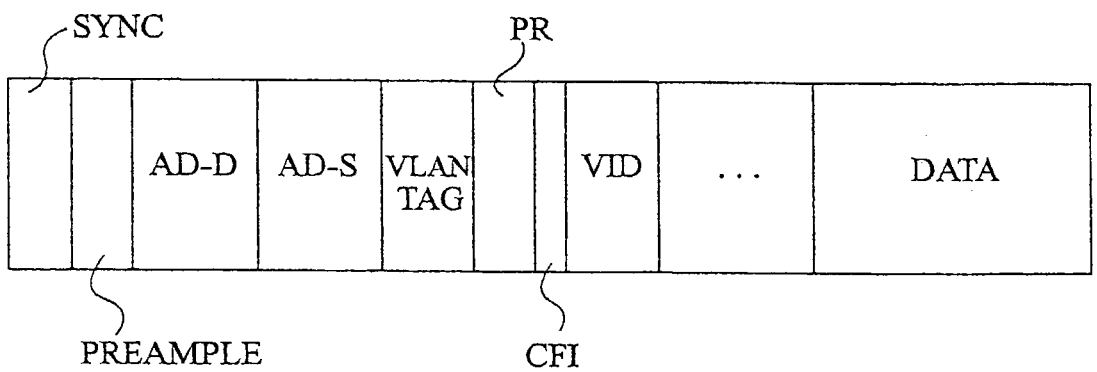
FIG. 3, previously described, illustrates the structure of a data packet according to the Ethernet communication protocol.

The same reference numerals represent the same elements in the following drawings. Only those elements useful for the understanding of the present invention have been shown.

Figure 4:
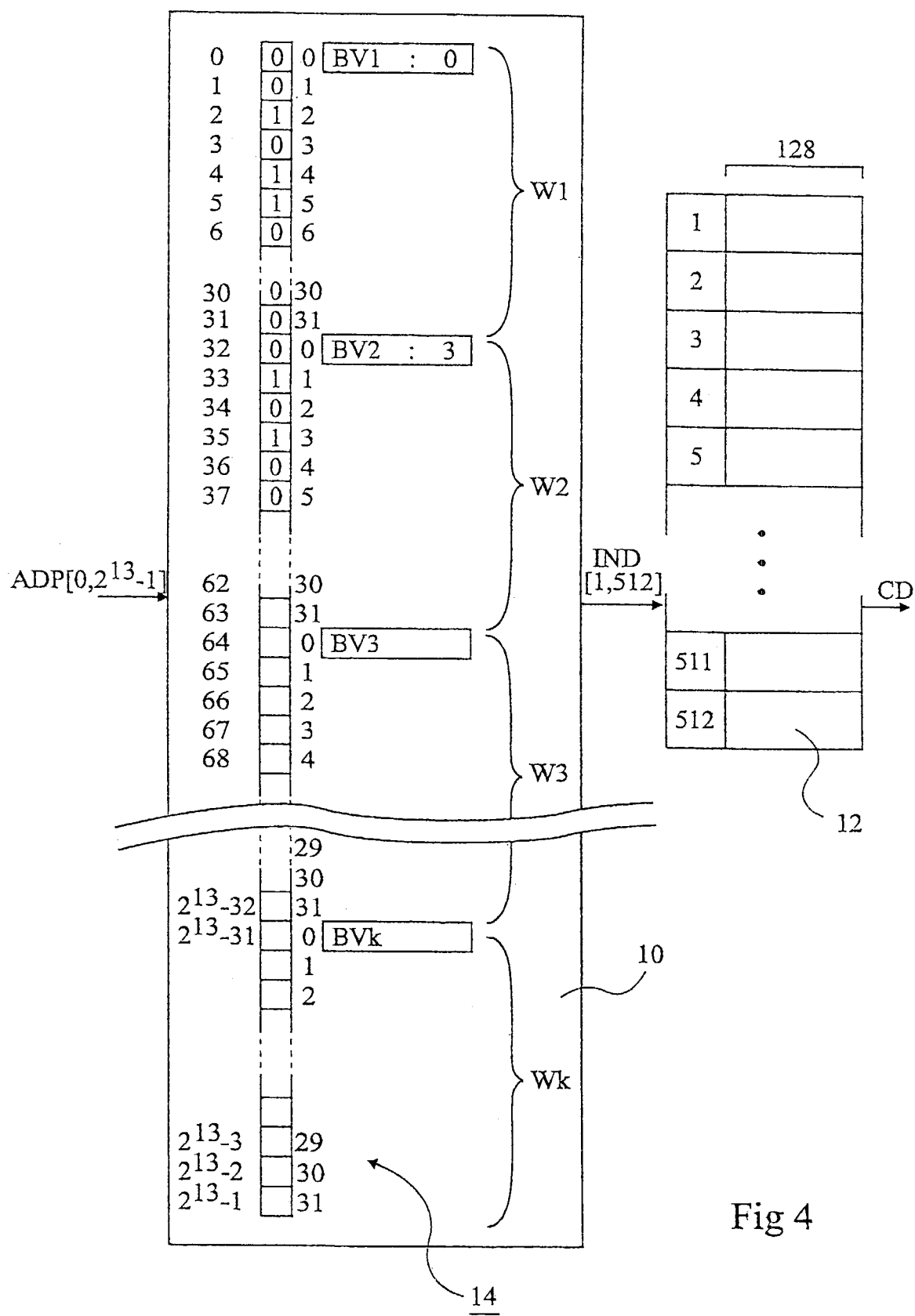
FIG. 4 illustrates the principle of a circuit according to the present invention.

FIG. 4 illustrates the principle of a circuit according to the present invention. The circuit comprises a unit 10 for providing an index that can be addressed by an address pointer ADP. Pointer ADP is calculated based on a received MAC/VID address couple. As an example, pointer ADP may be equal to a reduced address of 13 bits, that can take $n=2^{13}$ values, associated with the 60-bit MAC/VID address couple according to the method described in the patent application entitled "Method For Associating With A First Address A Second Address Of Reduced Size", filed on even date herewith under attorney docket number S01022.80963, and incorporated herein by reference.

Unit 10 comprises an intermediary memory or table 14 comprising a 1-bit indicator for each value of pointer ADP. The indicator is equal to 1 if the MAC/VID couple corresponding to the pointer is associated with a device operating in the system. The indicator is equal to 0 otherwise. The indicators of unit 10 are arranged in words Wi, each comprising a number b of bits, where i ranges between 1 and k and where $k.b<=n<(k+1).b$. A base value BVi is associated with each word Wi. Base value BVi is also stored in memory 14. The base value BVi associated with each word Wi has a value ranging between 0 and m-1, where m is equal to the maximum number of operating devices of the system.

Unit 10 provides an index IND for each value of pointer ADP. The value of index IND is equal to the sum of the base value associated with the word comprising the indicator pointed at by pointer ADP and of the number of indicators equal to 1 comprised between the indicator pointed at by pointer ADP and the beginning of the word. Index IND has a maximum value equal to m. Index IND enables addressing a context memory 12 storing the context data associated with the MAC/VID couples.

As an example, in FIG. 4, memory 14 is considered to comprise words of b=32 bits. It is further considered that the maximum number of operating devices in the system is m=512.

To illustrate the calculation of index IND, it is considered that only the bits of rank 2, 4, 5, 33, and 35 of memory 14 are associated with five operating devices and have value 1. It is finally considered that a zero base value BV1 is associated with word W1, and that a base value BV2 equal to 3 is associated with word W2.

To the first operating device of the system, which is here associated with value 2 of pointer ADP, that is, to the bit of rank 2 of word W1, corresponds an index equal to the sum of the number of bits at 1 included between the beginning of word W1 and the bit of rank 2 of word W1, here, 1 bit, and of value BV1=0, that is, an index equal to 1.

Similarly, an index equal to 2 corresponds to the second operating device of the system, which is here associated with value 4 of pointer ADP, that is, with the bit of rank 4 of word W1, and an index equal to 3 corresponds to the third operating device of the system, which is associated with value 5 of pointer ADP.

To the fourth operating device of the system, which is associated with value 33 of pointer ADP, that is, with the bit of rank 1 of word W2, corresponds an index equal to the sum of the number of bits at 1 included between the beginning of word W2 and the bit of rank 1 of word W2, here, 1 bit, and of value BV2=3, that is, an index equal to 4.

Finally, to the fifth operating device of the system, which is associated with value 35 of pointer ADP, that is, to the bit of rank 3 of word W2, corresponds an index equal to 5.

According to the present invention, the k 32-bit words of memory 14 take up a memory space of k.32 bits. The k base values BVi, coded over 9 bits, associated with words Wi of memory 14, take up a memory space of k.9 bits. Unit 10 thus uses a total memory space of k.41 bits, where $k=2^{13}/32$. Considering that a context datum comprises 128 bits, memory 12 comprises 65,536 bits. Thus, for the example chosen as an illustration, a switching equipment according to the present invention enabling providing a context datum associated with a device of a system that can include up to 512 operating devices based on $2^{13}$ possible values of an address pointer, requires a memory space of $65,536+41.2^{13}/32=76,032$ bits.

As a comparison, an equivalent switching equipment using the 13-bit pointer ADP for directly pointing to a context memory should include a context memory comprised of $2^{13}$ 128-bit locations, that is, a memory space substantially thirteen times as large as the memory space used according to the present invention.

Figure 5:
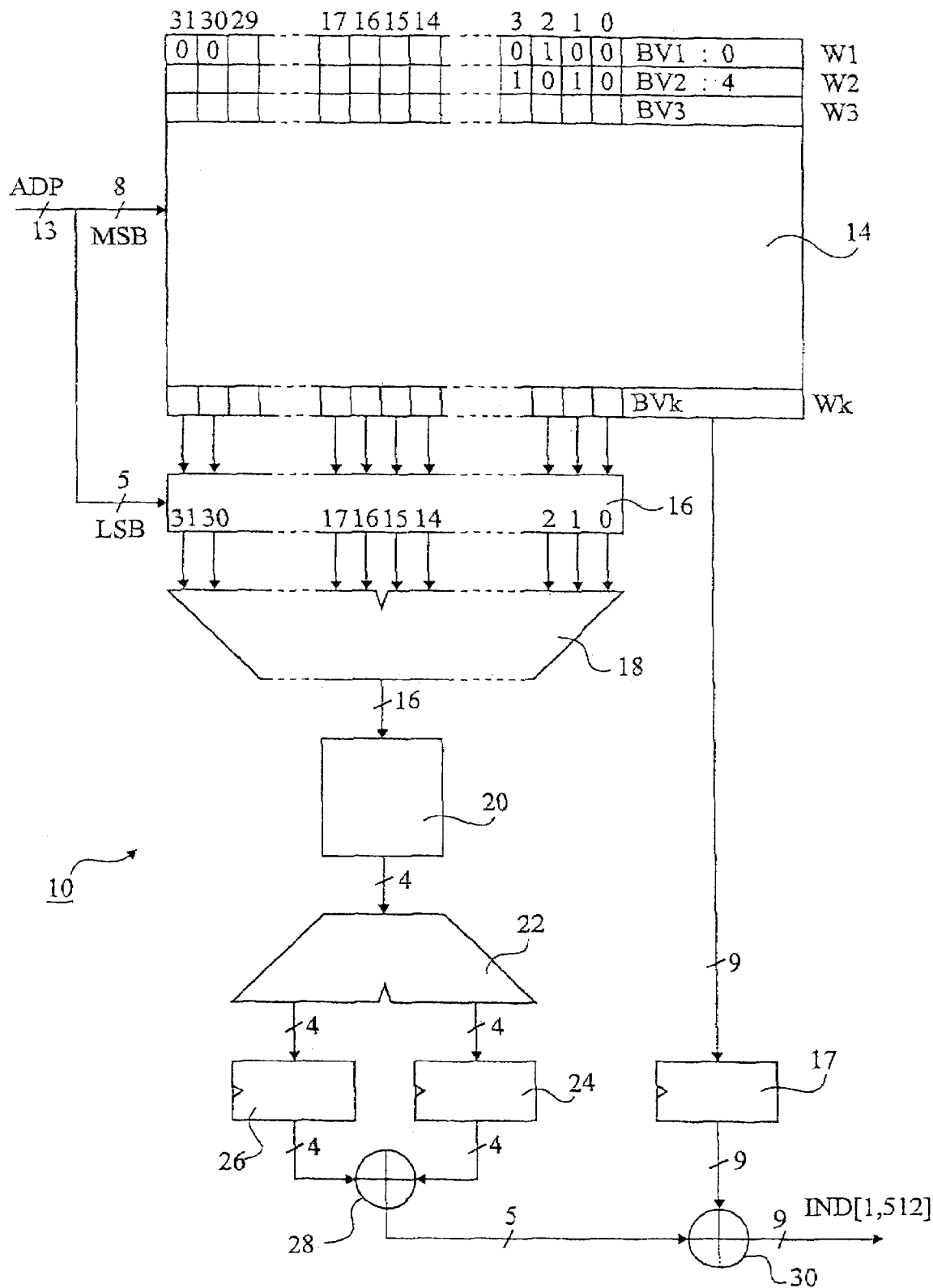
FIG. 5 schematically shows an embodiment of a circuit according to the present invention.

FIG. 5 schematically shows an embodiment of a unit 10 according to the present invention. Memory 14 comprises k rows. Each row i, where i ranges between 1 and k, stores word Wi of rank i and the base value BVi associated with this word. Memory 14 is addressed by address pointer ADP deprived of its 5 least significant bits. Memory 14 is connected to provide the 32 bits of the stored word in a row addressed to a masking circuit 16, and to provide a storage element 17 with the base value associated with this word. Masking circuit 16 is addressed by the 5 least significant bits of address pointer ADP and provides 32 bits masked as described below. A multiplexer 18 with two inputs of 16 bits each is connected to receive on a first input the 16 least significant bits provided by masking circuit 16, and on its second input the 16 most significant bits provided by masking circuit 16. A coding circuit 20 is connected to receive the 16 bits output by multiplexer 18. An output of circuit 20 is connected to a two-output demultiplexer 22. The first and second outputs of demultiplexer 22 are respectively connected to storage elements 24 and 26. The outputs of storage elements 24 and 26 are connected to two inputs of an adder 28. The output of adder 28 and the output of storage element 17 are connected to two inputs of an adder 30. The output of adder 30 provides index IND generated by unit 10. Multiplexer 18, demultiplexer 22 and storage elements 17, 24, and 26 are controlled by a state machine not shown, the implementation of which is within the abilities of those skilled in the art.

When an address pointer ADP of value q (where value q ranges between 0 and n-1) is provided to unit 10, memory 14 is addressed by a value j equal to the integral part of q/32. The corresponding 32-bit word Wj comprises the bit associated with value q of the address pointer. Memory 14 provides the 32 bits of word Wj to masking circuit 16, and the value BVj associated with word Wj is stored in storage element 17. Masking circuit 16 is provided to only output the bits of word Wj included between the least significant bit (included) of word Wj and the bit (included) of word Wj having an address corresponding to the five least significant bits of value q. Multiplexer 18 is controlled for, successively, addressing coding circuit 20 with the 16 less significant bits provided by masking circuit 16, then addressing coding circuit 20 with the 16 most significant bits provided by masking circuit 16. Coding circuit 20 is a ROM comprising 16 4-bit rows. Each row of ROM 20 comprises, coded over 4 bits, the number of bits having value 1 used to code the address of this row (1 bit for addresses 1, 2, 4, and 8; 2 bits for addresses 3, 5, 6, 9, 10, and 12; etc.). ROM 20 thus successively provides the number of bits having value 1 included in the 16 least significant bits provided by masking circuit 16, then in the 16 most significant bits provided by masking circuit 16. These numbers of bits are respectively stored in storage elements 24 and 26. As a result, adder 28 provides the number of bits having value 1 included between the first bit of word Wj and the bit associated with value q. This number of bits, added by adder 30 to value BVj stored in storage element 17, is equal to the index IND corresponding to value q.

The value BVi associated with each word Wi depends on the order in which the context values associated with the system devices are stored in context memory 12. If the context values associated with devices associated with increasing pointer values are stored in increasing addresses of context memory 12, values BVi increase along with i. Value BVi associated with a word Wi is then equal to the value of the higher index associated with the preceding word Wi-1. Such an arrangement is especially possible after a first writing into memory 14 and context memory 12, for example, after initialization of the switching equipment according to the present invention. Any modification of the system by addition or suppression of a device is likely to modify the content of memories 14 and 12, and especially values BVi.

It is assumed as an example that a device associated with a small value of the data pointer is eliminated from the system. The location in the context memory which used to store the context datum associated with the removed device, and which used to correspond to a low index value, is freed. If a device associated with a high value of the pointer is then added, the context datum associated with the added device is stored in the location left free in the context memory. The high value pointer associated with the added device, which is assumed to be located in a word Wp of high rank p, must correspond to an index of low value. Base value BVp associated with high rank word Wp must then be small. The possibility, provided by the present invention, of adjusting the base value associated with each word Wi advantageously enables rapid adjustment of the operation of unit 10 to system modifications without resorting to a complete reorganization of context memory 12.

Of course, the present invention is likely to have various alterations, modifications, and improvements which will readily occur to those skilled in the art. As an example, the present invention has been described with indicators gathered in 32-bit words, but those skilled in the art will easily adapt the present invention to indicators gathered in words of a different size.

The present invention has been described in relation with a context memory comprising a specific number of locations and an address pointer able to take a specific number of values, but those skilled in the art will readily adapt the present invention to a switching equipment comprising a context memory of different size and able to receive an address pointer that can take a different number of values.

The present invention has been described in relation with a communication system using a LAN network and exchanging data according to the Ethernet protocol, but those skilled in the art will readily adapt the present invention to any communication system using another type of network, for example, a global network of WAN type, or exchanging data according to a protocol other than the Ethernet protocol, requiring association of a context datum to a source and/or destination device based on an address datum associated with said device.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for providing a context datum associated with a source and/or destination device based on an address datum associated with said device, comprising the steps of:
    a) addressing, based on the address datum, a unit for providing an index, said unit containing, for each address datum, an indicator indicating whether the device is active; and
    b) addressing, based on the index provided by said unit, a context memory for providing the context datum associated with said device, wherein
        the context memory is capable of containing a number m of context data equal to a maximum number of system devices that can be active, and wherein the unit is capable of receiving a greater number n of address data, and
        the unit comprises a look up table composed of n bits distributed in an integral number of words of same size, each bit corresponding to an indicator having value 1 if said indicator indicates an active device and value 0 if not, a specific value being associated with each word, and
        the index associated with any indicator is determined on a basis of a sum of a number of bits equal to 1 between the bit corresponding to said indicator and the beginning of the word containing said bit and of the predetermined value associated with said word.

2. The method of claim 1, wherein the index provided by the unit is determined on the basis of the number of indicators indicating an active device between a predetermined position of the unit and the indicator corresponding to said device.

3. The method of claim 1, wherein said context datum associated with said source and/or destination device and said address datum associated with said device are in accordance with the Ethernet communication protocol.

4. A circuit for, in a communication system, providing a context datum associated with a source and/or destination device based on an address datum associated with said device, comprising:
    a unit addressable on the basis of the address datum to provide an index, said unit containing, for each address datum, an indicator indicating whether the device is active; and
    a context memory provided for, based on the index provided by said unit, providing the context datum associated with said device, wherein
        the context memory is capable of containing a number m of context data equal to a maximum number of system devices that can be active,
        the unit is capable of receiving a greater number n of address data, and wherein the unit comprises
            a storage means for storing n bits distributed in an integral number of words of same size, each bit corresponding to an indicator of the unit, and having value 1 if said indicator indicates an active device and value 0 if not, and a predetermined value associated with each word, and
            a calculation means for calculating the index associated with any indicator of the unit based on a sum of a number of bits equal to 1 between the bit corresponding to said indicator and the beginning of the word containing said bit and of the predetermined value associated with said word.

5. The circuit of claim 4, wherein the calculation means comprises:
    a masking means for providing only the bits located between a first bit corresponding to said indicator and a second bit corresponding to the least significant bit of the word containing the first bit, including the first and second bits;
    a counting means for counting the bits having value 1 among the bits provided by the masking means; and
    an adder for adding the predetermined value associated with said word and the value provided by the counting means.

6. The circuit of claim 5, wherein the counting means comprises a ROM addressed by the bits provided by the masking means and storing, for each address provided by the masking means, the number of bits having value 1 used to code said address provided by the masking means.

7. An apparatus for providing a context datum associated with a source and/or destination device based on an address datum associated with said device, the apparatus comprising:
    a unit addressable on the basis of the address datum to provide an index, said unit containing, for each address datum, an indicator indicating whether the device is active; and
    a context memory provided for, based on the index provided by said unit, providing the context datum associated with said device, wherein
        the context memory is capable of containing a number m of context data equal to a number of system devices that can be active,
        the unit is capable of receiving a number n of address data, wherein the unit comprises
            a storage means for storing n bits distributed in an integral number of words of same size, each bit corresponding to an indicator of the unit, and having value 1 if said indicator indicates an active device and value 0 if not, and a predetermined value associated with each word, and a calculation means for calculating the index associated with any indicator of the unit based on a sum of a number of bits equal to 1 between the bit corresponding to said indicator and the beginning of the word containing said bit and of the predetermined value associated with said word.

8. The apparatus of claim 7, wherein the number n of the address data is greater than the number m of the context data.

9. The circuit of claim 7, wherein the calculation means comprises:

a masking means for providing bits located between a first bit corresponding to said indicator and a second bit corresponding to the least significant bit of the word containing the first bit, the bits including the first and second bits;

a counting means for counting bits having value 1 among the bits provided by the masking means; and an adder for adding the predetermined value associated with said word and the value provided by the counting means.

10. The circuit of claim 9, wherein the counting means comprises a read-only memory addressed by the bits provided by the masking means and storing, for each address provided by the masking means, the number of bits having value 1 used to code said address provided by the masking means.

* * * * *